(12) United States Patent
Grimseth et al.

(10) Patent No.: US 8,466,591 B2
(45) Date of Patent: Jun. 18, 2013

(54) BEARING SYSTEM FOR HIGH SPEED ROTARY MACHINE IN A SUB SEA ENVIRONMENT

(75) Inventors: Tom Grimseth, Oslo (NO); William Bakke, Røyken (NO)

(73) Assignee: Statoil ASA, Stavanger (NO)

( * ) Notice: Subject to any disclaimer, the term of this patent is extended or adjusted under 35 U.S.C. 154(b) by 470 days.

(21) Appl. No.: 12/878,802

(22) Filed: Sep. 9, 2010

(65) Prior Publication Data

US 2011/0057528 A1    Mar. 10, 2011

Related U.S. Application Data

(60) Provisional application No. 61/241,120, filed on Sep. 10, 2009.

(51) Int. Cl.
*H02K 7/09* (2006.01)
*F16C 32/04* (2006.01)

(52) U.S. Cl.
USPC ............................................. 310/90.5; 310/90

(58) Field of Classification Search
USPC .................................................... 310/90, 90.5
See application file for complete search history.

(56) References Cited

U.S. PATENT DOCUMENTS 3,791,704 A * 2/1974 Perper ........................... 310/90.5
5,435,393 A   7/1995 Brekke et al.
6,914,361 B2  7/2005 Beyer et al.
2003/0184176 A1* 10/2003 Steinmeyer .................. 310/90.5
2011/0057528 A1*  3/2011 Grimseth et al. ............ 310/90.5

FOREIGN PATENT DOCUMENTS

| CA | 2 310 191 A1 | 11/2000 |
| GB | 2376488 A | 12/2002 |
| JP | 7042737 A | 2/1995 |
| WO | WO 2008/004875 A1 | 1/2008 |

\* cited by examiner

*Primary Examiner* — Tran Nguyen
*Assistant Examiner* — David Scheuermann
(74) *Attorney, Agent, or Firm* — Birch, Stewart, Kolasch & Birch, LLP (57) ABSTRACT

The present invention discloses a bearing system for a high speed rotary machine, said bearing system comprising a rotor shaft (51) including a plurality of active magnet or hydrostatic radial bearings (10,11,12,13,14,15) and at least one active magnet or hydrostatic axial bearing (16) for supporting said rotor shaft (51), said axial bearing (16) being arranged at one end of said rotor shaft (51), said bearing system also comprising a permanent magnet (PM) axial bearing arranged at a same end as the at least one active magnet or hydrostatic axial bearing (16), said permanent magnet axial bearing comprising at least one permanent magnet (52) arranged on the rotary shaft (51) and at least one permanent magnet (50) connected to a control system for varying a distance or gap (67) between said permanent magnets (50, 52), thus providing a variable force in said permanent magnet axial bearing in order to counteract at least semi-static axial forces imposed on said rotor shaft (51).

20 Claims, 6 Drawing Sheets

FIG. 10-1 Hydrostatic circular pad made up of two parallel disks and a round recess.

FIG.5

$$W = \frac{\pi}{2} \frac{R^2 - R_0^2}{\ln(R/R_0)} p_r \qquad (10\text{-}11)$$

Equation (10-11) can be rearranged as a function of the recess ratio, $R_0/R$, and the expression for load capacity of a hydrostatic pad is $$W = \frac{\pi R^2}{2} \frac{1 - (R_0/R)^2}{\ln(R/R_0)} p_r \qquad (10\text{-}12)$$

The expression for the flow rate $Q$ is obtained by rearranging Eq. (10-6) as follows:

$$Q = \frac{\pi}{6\mu} \frac{h_0^3}{\ln(R/R_0)} p_r \qquad (10\text{-}13)$$

$$\dot{E}_t = \frac{1}{\eta_2} \frac{1}{6} \frac{\pi h_0^3}{\mu \ln(R/R_0)} p_r^2 + \frac{1}{\eta_1} \frac{\pi}{2} \mu \frac{R^4}{h_0} \left(1 - \frac{R_0^4}{R^4}\right) \omega^2 \qquad (10\text{-}18)$$

FIG. 5 (Cont'd)

BEARING SYSTEM FOR HIGH SPEED ROTARY MACHINE IN A SUB SEA ENVIRONMENT

This nonprovisional application claims the benefit under 35 U.S.C. 119(e) of U.S. Provisional Application No. 61/421,120 filed on Sep. 10, 2009. The entire contents of the above application is hereby incorporated by reference into the present application.

The present invention relates to subsea processing/boosting of hydrocarbons from a set of subsea production wells, or boosting of a water phase for injection, and particularly relates to design and operation of compressors, pumps and other processing components characterised by rotary action and high speed of operation. Most such machines will typically be driven by means of a high speed electrical motor, in turn driven by a variable frequency and voltage power supply.

More specifically, the present invention relates to a bearing system for a high speed rotary machine as stated in the introductionary part of independent claim 1.

A bearing system is proposed consisting of a combination of a conventional active magnetic bearing system or a hydrostatic bearing system superimposed on an essentially passive permanent magnetic (PM) system. In combination, the two systems, respectively a dynamic, high response, low power conventional system and a near static, PM system, handle all the forces in a high power, high speed compressor/pump and drive, such as to provide a reliable and economical bearing system, typically suitable for a subsea machine, and typically applied to a vertical shaft machine, the latter required to operate for several years between maintenance operations.

This combination results in the active, closed loop magnetic circuits (servos) being required only to handle a fraction of the power rating required of an all active system. It will also facilitate feasibility and practicality of a hydrostatic bearing system for the dynamic part of the power, an alternative which is attractive by merits of its inherent simplicity, but impractical for handling of high speed and high forces in combination, as found in a large, high power compressor.

The ensuing solution, which involves the PMs mounted on a carriage of controllable position (servo of low power), is more cost effective in a subsea context than the conventional all active magnetic system and also more effective than a regular hybrid system (PMs and active circuits mixed) with the PM part mounted in a fixed position without facilities for moving the magnets such as to actively control the forces of magnetic attraction.

Prior art on active magnetic bearing systems is also comprehensive, as the product has been on the topsides market for many years and is commercially well established.

Background information on bearing systems in general is massive and beyond the scope of this application.

Although the invention relates both to horizontal shaft machines and vertical shaft machines it is most obviously applied to the latter. For a subsea fast rotary machine (typically up to some 1200 radians per second) there are all the three types of main bearing classes to be considered:
1. Roller type
2. Hydraulic type (hydrostatic or hydrodynamic or a combination, liquid or gas types)
3. Magnetic bearings For a large machine, as perceived in a subsea context, e.g. 10-15 megawatt (MW) of rated power, 1 and 2 above are associated with relative simplicity in design, but also with severe power losses. Especially 2 is such in dimension as to render the machine more or less impracticable. 1 will be associated with a major "lube" unit, a facility for cooling and filtering and circulation of a liquid for providing an optimum environment for the bearing. For the case of a liquid hydrostatic system the need for small fluid gap in the landings and high fluid pressure to offset axial fluid thrust is counterproductive with respect to fluid shear and circulation losses. A gas based hydrostatic thrust bearing will hardly achieve sufficient stiffness. This leaves magnetic bearings as the highest performing technology. The are in this context characterised by complexity in design, high cost and based on a demanding closed loop control circuit for stability. They offer, however, very moderate power losses and if successfully applied may be the core technology enabler of a large, fast rotating machine, such as is typically required to achieve effective compression of a gas phase on the sea-bed at high ambient pressures.

The present invention is based on essentially balancing the static force from the gravity of the rotor assembly and the semi-static process reaction force from the compressor blades by means of permanent magnets alone, i.e. an essentially static and zero power system as the main thrust bearing device. The sum of the 2 referred force components make up the bulk of the system of forces acting on the rotor assembly at any time. It is suggested that for a given design the sum of these two forces could represent as much as 90% of the total load on the bearings.

The basic idea is to balance the bulk of the axial forces, which are static or semi-static in nature, by means of passive magnets, and then superimpose either a conventional hydrostatic or active magnet system to handle the fast variations, but moderate powers, of the dynamic loads, such as motor magnetic forces, vibrations, etc. The concept of providing a hybrid system mixing both passive PMs and active magnetic circuits is not novel per se. A novel feature of the present invention is to mount the PMs on a movable mechanical arrangement, thus providing a variable force to counteract the static and semi-static axial forces of a vertical shaft machine.

Forces associated with the condition in a compressor known as surge can also set up variations in the axial forces which are relatively dynamic and require control systems with faster response times than those associated with normal process variations. Surge is a condition which requires immediate action. Most compressors are equipped with an anti-surge valve which quickly connects a conduit between the outlet side and the inlet side to relieve the unacceptable differential pressure across the compressor. Depending on the efficiency of the anti-surge arrangement the PM of variable force described above may be more or less efficient.

Permanent magnets (PMs) have developed rapidly over the last few years and such PM materials as e.g. Samarium Cobalt (e.g. SmCo5, Sm2Co17) or Neodymium Iron Boron (Nd2Fe14B) exhibit very high values of Energy Product and Coercive Force, providing a basis for high forces of attraction and long lasting operation without noticeable reduction of the performance. Most high performance PM materials tend to require consideration of the limited corrosion resistance and the somewhat brittle nature of the materials, however, such limitations may be overcome by suitable design, as is demonstrated by the extensive application in state-of-the-art, PM based, electrical motors.

The suggested approach and use of permanent magnets on a movable mechanical arrangement will reduce the power levels of the dynamic system to a fraction of what would otherwise be required of an all active magnetic system or indeed any other known bearing system. This reduction in power level is of fundamental importance to both active magnetic bearings and hydrostatic bearings as applied in a subsea context. The difference may not be equally significant for a land based installation, but recent investigations, design work and qualification efforts have demonstrated the massive effort required to handle the full power levels of an all active magnetic bearing system in a subsea context, and also raised issues over reliability, weight, size, modularity, maintainability and other aspects of prime concern in subsea installations.

The combination of high speed of revolution and high loads is inherently demanding. When, in addition, the machine must be purged with some type of fluid of significant viscosity, as is invariably the case for a subsea machine, the selection of viable and practicable bearing systems is limited as compared to a machine operating in a 1 atmosphere environment.

For, say, a 12 MW machine operating at a speed of 1000 radians per second, and for handling of a rotor assembly mass (motor and compressor both) of some 2-3 tonnes combined with the significant process force, maybe in order of magnitude 20 kilonewtons (kN), or roughly some 40 000 lbf, the ensuing total load is in order of magnitude 45 kN. For such a machine a substantial shaft diameter is required for load bearing and stability, thus making any rotary hydraulic seal subject to severe restriction in terms of pressure. Many literature sources suggest the maximum pv value (product of linear speed in meters per second and pressure in bars) as 1400, thus limiting the seal operating speed and pressure to e.g. 14 bars and 100 meters per second, which is not a practicable combination. Thus it is not practicable to balance the force by means of a sealed hydraulic counterforce. Also there are severe issues over life time and reliability of such seal elements.

Both a conventional liquid based hydrostatic bearing (despite the contradiction in terms it is based on hydrodynamic effects, the term is used to suggest that it is independent of the machine's rotary action, which is the basis of operation for hydrodynamic bearings) and a roller bearing will suffer massive power losses in fluid shear and circulation of fluid, reducing overall efficiency and creating a severe cooling problem. A lube unit providing the fluid required at the conditions (cleanliness and temperature) will be significant in its own right. Thus there are massive practical problems associated with any such approach based on handling the full thrust by means of said techniques.

The rule-of-thumb is that an all active magnetic system requires a power input of some 1 per mille (or 1000 ppm) of the power rating of the machine that it serves in order to function. For the example machine of 12 MW rating this rule would suggest a power consumption of some 12 kW for the active magnetic bearing system. In 1 atmosphere applications design and construction of 5-7 servo circuits, each of average power capacity of some 2 kW has been demonstrated to be a successful operation, and has for several designs resulted in reliable and high performance systems. Particularly turboexpanders have taken great benefits from such facilities.

In the process of taking such servo circuits subsea a number of problems arise:
1. The heat export from a sealed, 1 bar, typically $N_2$ purged, canister containing semiconductors handling 12 kW is by no means trivial (although most of the power is dissipated in the active coils outside of the canister) and has caused significant problems in design. It tends to drive cost and size of subsea modules.
2. The penetrators required for cabling in/out of the canister need to be of zero leakage. Attempts to achieve this has turned out to be a very demanding and cost driving effort for high values of power.
3. For maintenance the canister needs to be in a module separately retrievable from the main compressor module such as to reduce intervention costs. This requirement drives the need for massive wet mate connectors between the modules, some of which tend to be borderline cases of proven design in terms of current rating.

Design effort into the subject has demonstrated that these problems can be solved, albeit at significant cost both in terms of investment and operation.

If the power requirement for the active magnets in a combined active and passive magnetic bearing system, and thus the servo circuits, were to be reduced to, say, 10% of the all-active system then significant gains would be achieved. Use of proven subsea components within each of the critical areas listed above would be feasible.

A purpose of the present disclosure is to describe means for achievement of such reduction of the power levels of the active part of the system and thus facilitate low cost and high reliability of the active servos, and possibly also paving the way for hydrostatic bearings, the latter could reduce the complexity of the bearing system radically (inherently stable system, no servo required and more convenient cooling system).

The bearing system according to the present invention is characterized by the features as stated in the characterizing part of independent claim 1.

Advantageous embodiments of the invention are stated in the dependent claims.

In the following, embodiments of the invention are described in more detail with references to the drawings.

Figure 1:
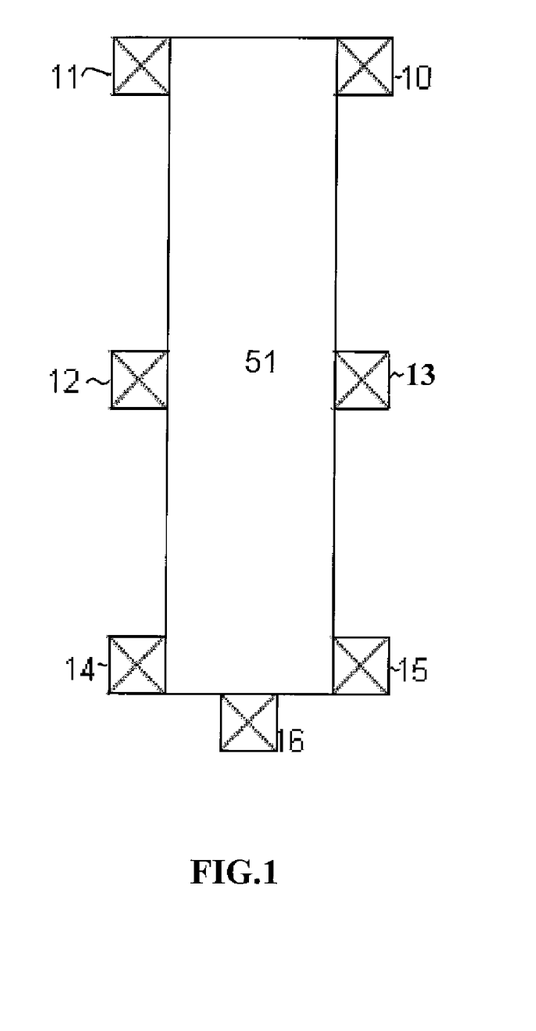
FIG. 1 illustrates a 7 axis magnetic bearing system, schematically and simplified.

Referring to the drawings, 10, 11, 12, 13, 14 and 15 are radial bearings of a 7 axis magnetic bearing system, handling very fast variations in force but subject to relatively moderate forces. 16 is the thrust bearing, characterised by very high forces of a static or semi-static type, superimposed by relatively small, but fast varying dynamic forces. The term static force refers to the gravity of the mass of the rotor assembly, which is obviously fixed with respect to time. The term semi-static force refers to the reaction forces of the process flow through the compressor, essentially the rotor blades pushing back the shaft, such as the shaft 51 as shown. These forces are basically a function of speed of revolution and differential pressure in the compressor. These forces vary with process parameter values, but only slowly, say with time constants in the multi-seconds or minutes domain. The term dynamic forces refers to the many sources of perturbation on the shaft 51 as located ideally in the centre of the bearing assembly, such as 10, 11, 12, 13, 14, 15, and include such normal sources as magnetic forces in the motor, vibrations of various types, etc. These forces must be handled by means of a very high response active servo system for the case of a magnetic bearing system and by means of hydraulic fluid films in the case of hydrostatic bearing systems.

Figure 2:
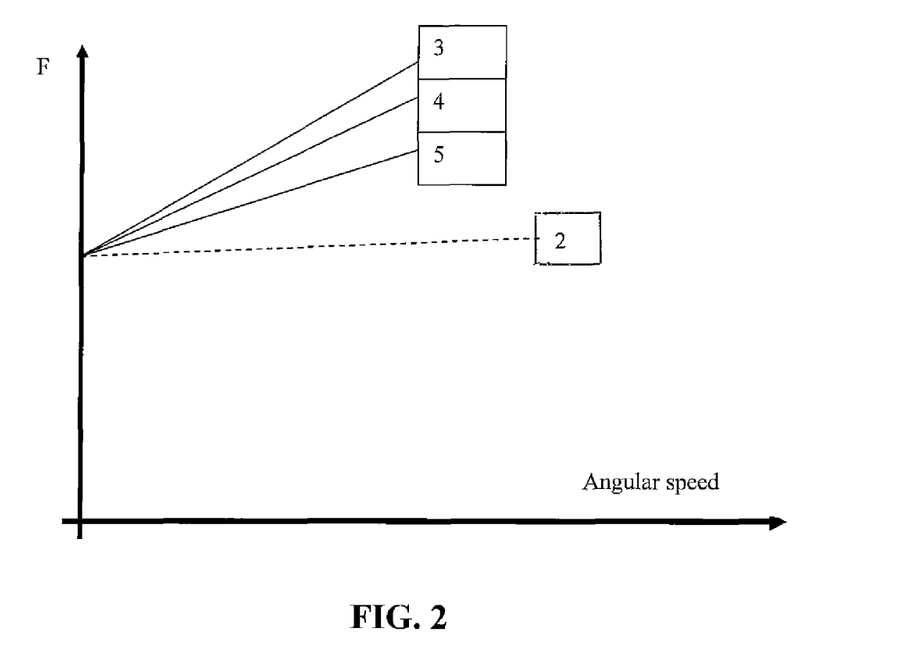
FIG. 2 illustrates the axial forces in a rotor assembly of a compressor unit driven by an electrical motor or a prime mover.

In FIG. 2 the y-axis represents units of force (e.g. in Newtons) and the x-axis represents units of angular speed of the machine (e.g. in radians per second). 3, 4 and 5 are curves representing variations in force for a given angular speed as a function of differential pressure in the compressor/pump. 2 is a linear, horizontal curve representing said gravity of the mass of the rotor assembly, which is fixed force. FIG. 2 is a very coarse representation intended to illustrate a point.

Figure 3:
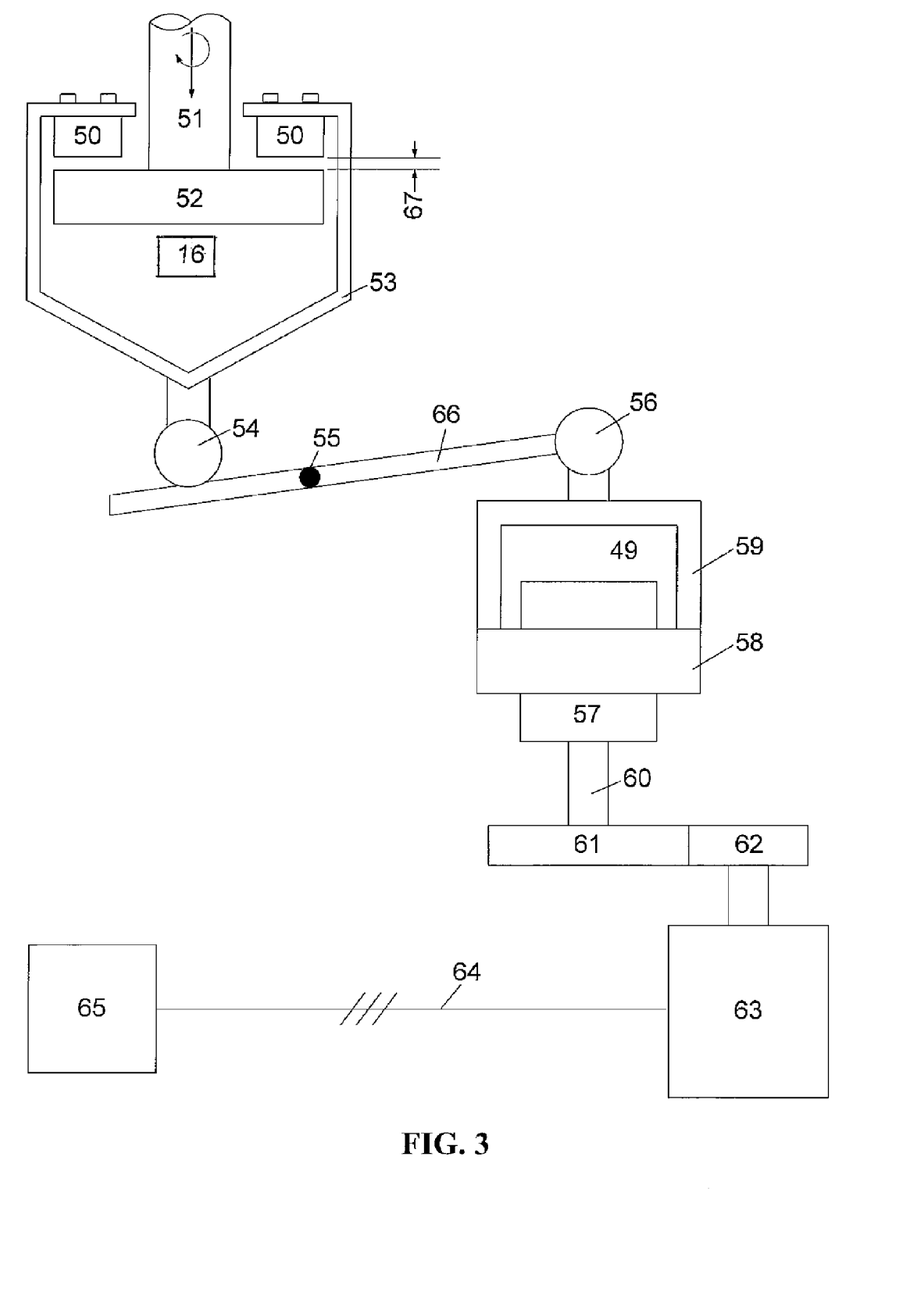
FIG. 3 illustrates schematically a slow servo unit embodiment for gradual control of the force exerted by the permanent magnets on the rotor assembly.

In FIG. 3, item 51 is the shaft of the rotor assembly, for the purpose of this embodiment assumed to carry all the axial forces from both rotors in the assembly. In practice there could be several ways of configuring the machine. It should also be understood that although this embodiment shows a vertical shaft, similar methods may be applied in the case of a horizontal machine. 52 is a disc made of magnetic material, consisting of thin plates electrically insulated to reduce eddy current losses, as normally found in a transformer core. 50 is a collection of permanent magnets located radially around the shaft (or a continuous annular disc), mounted on a disc in the static part of the machine. 67 is the "air gap" (in a subsea application most likely purged with a gas, typically a filtered version of the process gas). 53 is a mechanical arrangement for transmission of force from magnets 50 to the linkage lever 66 which rotates around the pivot point 55 and exerting force on the contact points 54 and 56. 49 is typically a roller screw unit or another rotary-to-linear conversion unit. A roller screw is preferred for its proven performance for any force of interest for the present invention and near zero friction, ensuring high efficiency. Roller screws are catalogue items up to at least 100 tonnes of force. They have been included in subsea actuator designs for 5" X-mas tree valves with a force rating of 40 tonnes plus and have demonstrated suitable performance. 59 is the nut and 58 is the screw part of the roller screw assembly. It may be noted that a self locking rotary-to-linear conversion unit could be applied. Thus, the break unit, which would be required if a roller screw were to be applied is not shown for simplicity. 61 and 62 are the wheels of a rotary gear assembly, the drive shaft of which is connected to the drive motor 63. The latter could be an asynchronous motor, permanent magnet motor or a stepper motor (or, in principle, a hydraulic motor). All three types are commonly applied to electromechanical position servo system. The motor would in any case be driven from a variable frequency and voltage unit 65. For minor power levels such variable frequency and voltage units have been demonstrated in a subsea context (in the case of an electrohydraulic control the techniques used to control the X-mas tree actuators could be applied).

Operationally the carriage 53 with the PMs 50 is located at the position of largest gap 67 when the machine is at standstill. On starting the machine and slowly ramping up the speed the carriage is moved closer to the disc such as to increase the magnetic pull as the process reaction force ramps up. Reverse action takes place on down-ramping the speed of operation.

The mechanism shown in FIG. 3 is per se just a conventional position controller circuit of a type very familiar to the artisan within the field of automation, but novel in the context of the present disclosure. Control and operation of this mechanism is addressed below. It should be noted that the circuit is operated in only 2 quadrants (as referred to servo terminology), meaning that the motion is bidirectional but the force is unidirectional, making sure there is no deadband, or lost motion, in the linkage system, thus loop stability is easily achieved and the risk of oscillations (limit cycles) essentially eliminated. In order to give this aspect some margin in operation a minor mechanical spring (not shown) could be added to ascertain pretension of the mechanical linkage system at all times.

The purpose of this position controller is to vary the distance, and thus the force, of attraction between the permanent magnets 50 and the disc 52. The force of the magnetic pull is inversely proportional to this distance. If, for instance, the magnetic pull at 1 millimeter distance 67 is 50 kilonewtons then the magnetic pull at 2 millimeter is 12.5 kilonewtons. Thus by slightly altering the distance 67 the desirable pull needed to counteract the weight of the rotor assembly and the process reaction force can be provided by means of a passive magnetic system and a slow, low power servo, operating, say in the 150-300 watts domain and only intermittently. The average power consumption of the servo is negligible.

The slow servo suggested is intended for applications where surges may be handled fast and effectively. For applications where such high response surge management is not practicable, a much faster servo of the conventional electrohydraulic type may be used, consisting of a hydraulic actuator (instead of the rotary-to-linear device as shown in FIG. 3) and a servo valve as the main components, supplied from a hydraulic accumulator. Together with a position sensor (e.g. a linear variable differential transducer (LVDT) and PD controller a very high response servo may be achieved, providing a facility to position the PMs in the correct position to counteract a given axial force.

Figure 4:
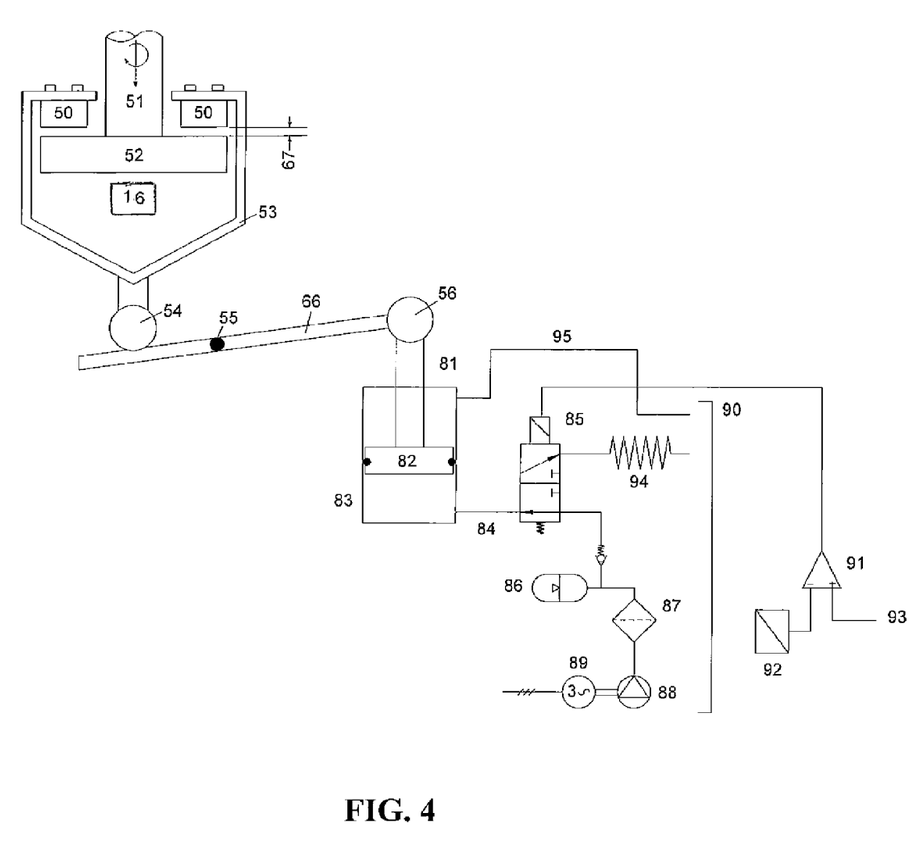
FIG. 4 illustrates schematically a high response servo unit embodiment for gradual control of the force exerted by the permanent magnets on the rotor assembly.

FIG. 4 illustrates schematically one particularly suitable control circuit based on a force servo and utilising a servo valve 85 which produces a pressure as output to the actuator in response to an electrical signal input. 81 is the actuator rod, 82 is the actuator piston, 83 is the actuator cylinder, 84 is a hydraulic line connecting the servo valve 85 with the actuator, 86 is a hydraulic accumulator, 87 is a hydraulic filter unit, 94 is a simple heat exchanger, 90 is the hydraulic sump, 88 is the hydraulic pump, 89 is the drive motor for the pump. 95 is the return line to the sump. In combination with a PID controller 91, setpoint input 93 and a force feedback transducer 92 a complete servo circuit may be achieved. This circuit may be configured in many ways, thus the circuit is given only a general representation as per FIG. 4. The characteristic feature of the arrangement on FIG. 4 is a high response servo, responding in the milliseconds domain, but consisting of proven components and circuitry.

Achievement of a near zero power, high force, PM bearing component does not solve the bearing problem in itself. At best it resolves the high force component. Still a practical application requires handling of the high frequency force components of lower power levels. It should be understood that the suggested servo for control of PM position with respect to the rotor is not intended to achieve dynamic performance of significance in the fractional seconds domain.

In order to achieve the suggested rationalisation of the dynamic part of the bearing system it may be necessary to impose very high requirements on the anti-surge valve arrangement. Fast acting anti-surge valves are entirely feasible and may be achieved by means of control circuitry well proven in subsea applications. Especially the combination of a hydraulic accumulator and actuator/return spring, actuator operated by a multistage valve, offers responses in the split-second domain.

Both an active magnetic bearing system (5 or 7 axis as required) and a hydrostatic bearing system may be added (superimposed) on to the suggested static and semi-static passive bearing component to achieve a complete and functional bearing system. The high force, slow servo described above may be operated in many ways, e.g. the methods addressed below being included for completeness.

For completeness, but not directly related to the present invention, the issue of heat export from the machine is briefly described. The power loss in the "air gap" is:
proportional to the square of the angular velocity
proportional to the $4^{th}$ power of the disc radius proportional to the fluid viscosity
inversely proportional to the "air gap"

The angular velocity is a functional requirement and cannot be radically changed for a compact machine. The disc radius is dictated by the inherent characteristics of the PM materials, thus the highest possible full forces/m2 should be pursued. The "air gap", which can be manipulated, must thus be as small as practicable at maximum pull to utilize the magnets to the full extent, and the viscosity must be low, suggesting a gas rather than a liquid.

If the pull disc 52 is located in process fluid, or in some other gas, there will still be a certain drag force from the shearing of the gas. For a liquid film the viscosity could typically be in order of magnitude 0.01 pascal seconds (Pa sec). For natural gas, however, the viscosity could be in order of magnitude 10 exp (−5) Pa sec. Also for a gas the viscosity is not much influenced by pressure, but significantly dependent on temperature. It is thus important to provide gas at suitable temperatures for the "air gap" 67. In some applications the gas will be produced gas running through the machine on a continuous basis. Cooling may also take part in an external tube coiled around the machine. Such cooling tubes have been implemented on subsea booster units rated at 2 MW with a cooling capacity for liquid of 300 kW. There are many aspects of heat balance in such a machine. Those aspects are not directly relevant to the present invention. It is sufficient to refer to these aspects as familiar to engineers and of proven performance for the present area of application.

Single "Position" Closed Loop:

The required PM position for a given set of parameter values may be calculated in a microprocessor based on such input as rotor assembly mass, speed of revolution, differential pressure across the compressor, temperature, fluid viscosity, etc. This may be used to calculate the setpoint of the servo, to be compared in a PD controller (proportional and differential) of conventional design. A PID controller would most likely be used in a practical application, since this is a standard, setting the I (integration) component to near zero for stability.

"Position" Closed Loop Inside of a "Force" Closed Loop Servo:

A second "force" loop may be closed outside of the "position" loop using the signal from a load cell located in the mechanical arrangement (e.g. between 51 and 56 or between 54 and 66) as the output value, to be controlled to be as close to the desired pretension value as possible at all operating conditions.

A detailed study of the suggested system would most likely reveal need for other details in the control system.

Figure 5:
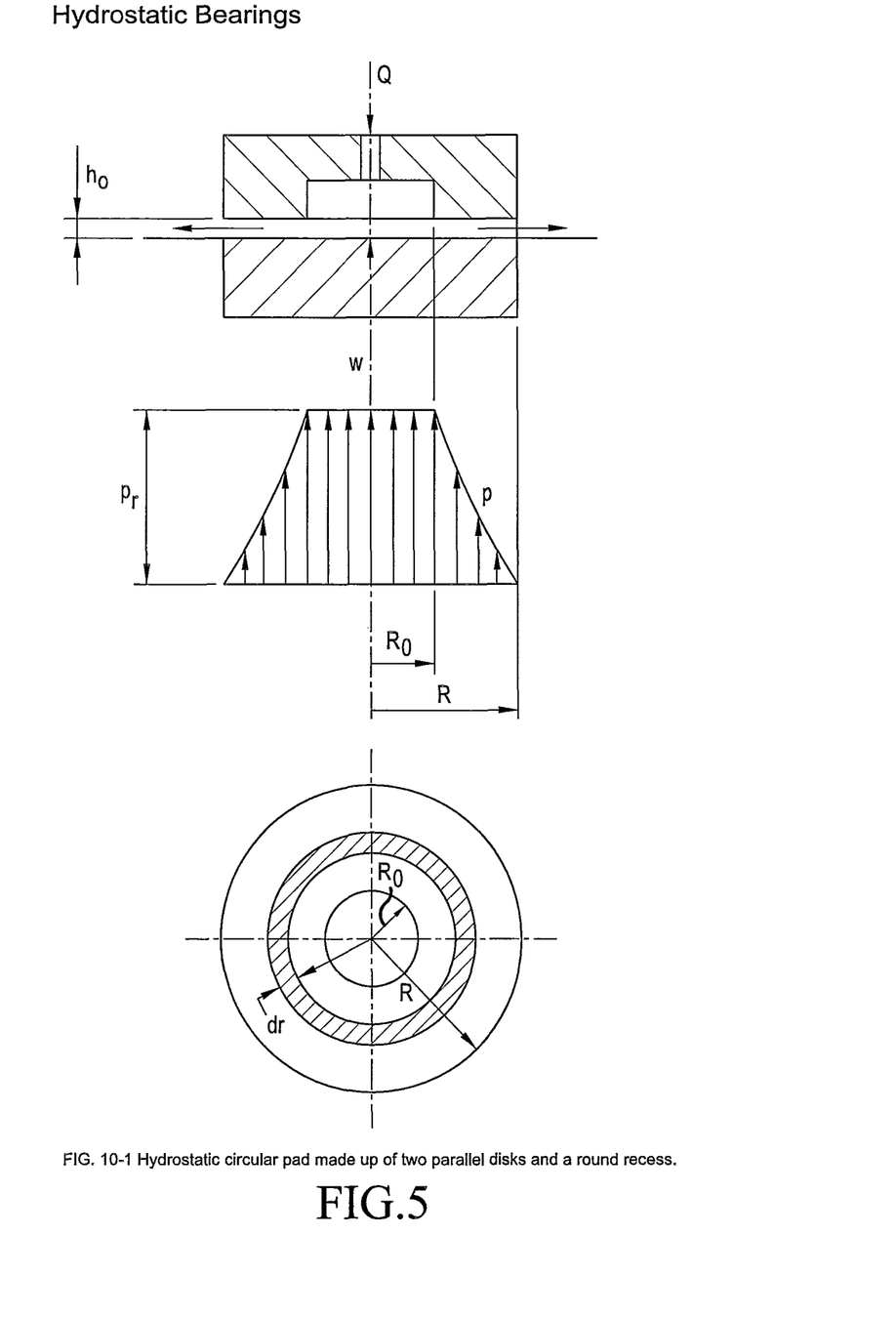
FIG. 5 is an illustration of a hydrostatic circular pad or thrust bearing and the related equations copied from "Bearing Design in Machinery" by Abraham Harnoy (Marcel Dekker 2003), chapter 10.

If power levels of the dynamic system can be brought down significantly compared to current standards and if the static and semi-static forces may be handled by means of an essentially passive system, then it may be considered to implement hydrostatic bearings for the 5-7 axis dynamic systems rather than magnetic circuits. Hydrostatic bearings cannot provide very high forces without incurring high power losses in the process (this is very obvious from the equations governing bearing weight capacity, bearing stiffness and associated power losses, ref. FIG. 5 which shows a copy of an illustration of a dynamic thrust bearing and equations governing the performance of such a pad bearing. The figure and equations are copied from "Bearing Design in Machinery" by Abraham Harnoy (Marcel Dekker 2003), chapter 10.

For application on cases of low force the conventional hydrostatic bearing offers significant advantages. Many such bearings have very high stiffness, (magnetic bearings have generally poor stiffness). Another benefit is the inherent stability and lack of control requirements. The hydrostatic bearing is inherently stable within its operating envelope (although engineering is required to manage cross-stiffness factors). Once the flow of fluid is established and maintained the bearing is self regulated.

With reference to FIG. 5 the force capacity in a hydrostatic bearing is as per equations 10-11/12. Obviously in order to get a high W a high p is required, and by investigating equation 10-18 it is obvious that the first term (power required to circulate the fluid) and the second term (power required by the main motor to shear the fluid in rotation) makes any high load bearing hydrostatic bearing of this type uneconomical. Pressures must be low in order to keep power requirements realistic.

The second term also indicates the unfortunate R exp 4 and ω exp 2, both of which will influence the disk counteracting the permanent magnets in a negative way, with R being large for a large machine and ω exp 2 well over a million (rads/sec) exp 2 for 10 000 rpm operation. The only way to reduce the flow power appears to be a low viscosity. For a typical commercial hydraulic oil it can be in the order of 0.01 Pa sec. Using a gas (process gas would seem attractive) should reduce the viscosity significantly, e.g. by a factor of, say, 1000, to order of magnitude 10 exp (−5) Pa sec, although at the cost of stiffness.

It may thus be concluded that a hydrodynamic bearing has limitations as applied to a very fast rotation and high forces in combination.

However, by introducing the servo circuit of FIG. 4 (for moving the pad, i.e. the PMs 50 relative to the magnetic disc 52) it is possible to combine the low loss requirement and the lower stiffness tolerance of steady state operation with the opposite characteristics of a transient situation. I.e. when for instance, a surge situation occurs, imposing severe axial transient forces on the shaft, the servo is activated to bring the clearance of pad landings (i.e. the "air gap" 67) to a lower value, thus increasing load bearing and stiffness at the cost of generating severe drag power losses. Such a situation with very high viscous forces may be tolerated for a transient situation, but would, if imposed in a steady state condition incur unacceptable losses. There is thus a parallel between the controllable PMs of the hybrid system described (PMs and active magnets in combination) and the controllable pad.

By the same token a controllable radial hydrostatic bearing may be beneficially pursued by introducing tapered landings (rather than the conventional cylindrical landings). Again, by means of a relatively simple servo the operating characteristics of the bearing system may be adjusted in the milliseconds domain.

As also indicated above, although not shown in the drawings, a bearing system for a high speed rotary machine with a horizontal or an inclined rotor shaft 51 is within the scope of the appended claims.

The invention claimed is:

1. A bearing system for a high speed rotary machine, said bearing system comprising
a rotor shaft including one of a plurality of active magnetic and hydrostatic radial bearings and at least one of at least one active magnetic and hydrostatic axial bearing for supporting said rotor shaft, said at least one of at least one active and hydrostatic axial bearing being arranged at one end of said rotor shaft; and
a permanent magnet axial bearing arranged at a same end as said at least one of at least one active magnetic and hydrostatic axial bearing, said permanent magnet axial bearing comprising at least one permanent magnet arranged on the rotary shaft and at least one permanent magnet connected to a control system for varying a distance or gap therebetween, thus providing a variable force in said permanent magnet axial bearing in order to counteract at least semi-static axial forces imposed on said rotor shaft.

2. The bearing system according to claim 1, wherein said rotor shaft is vertically arranged, said permanent magnet axial bearing also counteracting static axial forces imposed on said rotor shaft.

3. The bearing system according to claim 1, wherein a plurality of permanent magnets are radially located around the rotor shaft on a carriage axially moveable relatively to a disc shaped permanent magnet, thus varying said gap, said movement being induced by said control system via a pivotable linkage lever connected to the carriage at one end or contact point and to a control system actuator at another end or contact point.

4. The bearing system according to claim 3, wherein said control system actuator comprises a rotary-to-linear conversion unit.

5. The bearing system according to claim 4, wherein said roller screw unit comprises a nut and a screw, said control system further comprising wheels of a rotary gear assembly, connected firstly to said rotary-to-linear conversion unit via a driven shaft and secondly to a drive shaft driven by a drive motor, controlled in response to variations in axial force from said rotor shaft transferred via said carriage and said linkage lever.

6. The bearing system according to claim 3, wherein said control system actuator comprises a hydraulic cylinder and piston and an actuator rod.

7. The bearing system according to claim 6, wherein said control system further comprises a hydraulic line connecting said actuator with a servo valve, a hydraulic accumulator, a hydraulic filter unit, a heat exchanger, a hydraulic sump, a hydraulic pump, a drive motor for said pump, a return line to said sump, a PID controller, setpoint input and a force feedback transducer.

8. The bearing system according to claim 1, wherein said gap is filled with $N_2$ or is purged by process gas.

9. The bearing system according to claim 1, wherein the material of the permanent magnets is selected from a group comprising Samarium Cobalt (e.g. SmCo5, Sm2Co17) and Neodymium Iron Boron (Nd2Fe14B).

10. The bearing system according to claim 3, wherein operationally the carriage with the at least one permanet magnet is located at a position of largest gap when the machine is at standstill, and on starting said machine and slowly ramping up the speed said gap is reduced such as to increase magnetic pull as a process reaction force ramps up.

11. The bearing system according to claim 2, wherein that a plurality of permanent magnets are radially located around the rotor shaft on a carriage axially moveable relatively to a disc shaped permanent magnet, thus varying said gap, said movement being induced by said control system via a pivotable linkage lever connected to the carriage at one end or contact point and to a control system actuator at another end or contact point.

12. The bearing system according to claim 2, wherein said gap is filled with $N_2$ or is purged by process gas.

13. The bearing system according to claim 3, wherein said gap is filled with $N_2$ or is purged by process gas.

14. The bearing system according to claim 4, wherein said gap is filled with $N_2$ or is purged by process gas.

15. The bearing system according to claim 5, wherein said gap is filled with $N_2$ or is purged by process gas.

16. The bearing system according to claim 6, wherein said gap is filled with $N_2$ or is purged by process gas.

17. The bearing system according to claim 7, wherein said gap is filled with $N_2$ or is purged by process gas.

18. The bearing system according to claim 2, wherein the material of the permanent magnets is selected from a group comprising Samarium Cobalt (e.g. SmCo5, Sm2Co17) and Neodymium Iron Boron (Nd2Fe14B).

19. The bearing system according to claim 3, wherein the material of the permanent magnets is selected from a group comprising Samarium Cobalt (e.g. SmCo5, Sm2Co17) and Neodymium Iron Boron (Nd2Fe14B).

20. The bearing system according to claim 4, wherein the material of the permanent magnets is selected from a group comprising Samarium Cobalt (e.g. SmCo5, Sm2Co17) and Neodymium Iron Boron (Nd2Fe14B).

* * * * *